United States Patent [19]

White et al.

[11] Patent Number: 5,113,898
[45] Date of Patent: May 19, 1992

[54] VALVE ASSEMBLY FOR FLUID PRESSURE REGULATION

[75] Inventors: Lawrence W. White; Gabriel J. Pietrykowski; Stephen D. Able, all of Bryan, Ohio

[73] Assignee: The Aro Corporation, Bryan, Ohio

[21] Appl. No.: 532,747

[22] Filed: Jun. 4, 1990

[51] Int. Cl.$^5$ .............. F16K 51/00; G05D 16/06
[52] U.S. Cl. .................. 137/454.5; 137/505.42; 251/363
[58] Field of Search ............ 137/454.5, 505.42; 251/362, 363

[56] References Cited

U.S. PATENT DOCUMENTS

| | | | |
|---|---|---|---|
| 2,008,657 | 7/1935 | Deiller | 251/362 X |
| 3,134,572 | 5/1964 | Glasgow | 251/363 |
| 4,171,004 | 10/1979 | Cerrato et al. | 137/505.11 X |
| 4,506,690 | 3/1985 | Mitchell | 251/362 X |
| 4,693,267 | 9/1987 | Patterson | 137/505.42 X |
| 4,719,940 | 1/1988 | Beavers | 137/505.42 X |
| 4,781,213 | 11/1988 | Kilayko | 251/363 X |
| 4,942,899 | 7/1990 | Vork et al. | 137/454.5 |

Primary Examiner—Stephen M. Hepperle
Attorney, Agent, or Firm—Robert F. Palermo; Walter C. Vliet

[57] ABSTRACT

A valve assembly for fluid pressure regulation provides freedom from static pressure creep by eliminating distortions and stresses normally introduced to valve parts during assembly of the regulator. A floating valve seat permits normal installation of a valve seat housing in the regulator body with no transfer of stress or distortion to the valve seat. Thus statis pressure creep, normally attributable to micro distortions of the valve seat, is avoided. Options are also provided to install the floating valve seat directly in a regulator body without the valve seat housing.

8 Claims, 3 Drawing Sheets

VALVE ASSEMBLY FOR FLUID PRESSURE REGULATION

BACKGROUND OF THE INVENTION

This invention relates generally to fluid pressure regulators and more particularly to valves for fluid pressure regulation having resistance to static pressure creep.

A fluid handling system typically includes a device to regulate fluid pressure in the system. The fluid is supplied at a given pressure, usually higher than that desired at the system output ports. It is the function of the regulator device to reduce the fluid pressure to the desired level and to maintain it at that level regardless of variations in downstream flow demand or in supply pressure.

A common single-stage regulator has a fluid supply inlet chamber at the exit of which is a variable orifice valve having an annular seat and a spring biased ball, cone, or other closure element. The proximity of the closure element to the seat is controlled by a valve stem connected to a diaphragm downstream of the valve. The pressure drop of the fluid as it passes through the valve depends upon the size of the valve orifice which is determined by the proximity of the valve closure element to the valve seat.

Downstream from the inlet chamber and valve is the diaphragm chamber, one wall of which consists of a diaphragm whose stiffness is adjustably controlled by a screw adjustable spring which biases the diaphragm toward the diaphragm chamber. The exit from the diaphragm chamber is the service outlet of the regulator.

At any given setting of the diaphragm spring adjustment, the diaphragm assumes a position. When pressurized fluid is admitted to the chamber through the valve, the fluid exerts a force on the diaphragm counter to that exerted by the spring. The resulting displacement of the diaphragm causes a decrease in the valve orifice size as a result of withdrawal of the valve stem and the consequent closer approach of the valve closure element to the valve seat. This increases the pressure drop through the valve which causes the diaphragm to advance, thereby further opening the valve. These counterbalancing forces quickly establish an equilibrium which will obtain during steady flow, so long as the spring adjustment remains unchanged.

In most manufacturing operations there are periods of shut-down, during which the service line fluid flow is discontinued. At such times, there is a possibility of regulator creep which can result in excessive fluid pressure in service lines.

Regulator creep is usually attributable to failure of the valve closure element to properly close against the valve seat due to distortion of the seat or closure element or, infrequently, a dirty or corroded seat or element.

Seat distortion is usually due to thermal or mechanical stresses introduced during assembly of the regulator, by brazing the seat in its housing, by torquing the housing into the regulator body, or by a combination of these and other stress inducing activities. Even a seat which is clamped in metal to metal contact and which has a groove and "O" ring seal with the housing is subject to mechanically induced distortions.

Lapping, rethreading, and other superfinishing techniques are commonly employed to prevent assembly distortion. In spite of these efforts, a significant fraction of regulators must be reworked due to such distortions, and some valve assemblies must be scrapped.

In addition to the cost of rework and scrap in manufacturing of the regulators, if a regulator undergoes static pressure creep, it may cause damage to delicate fluid operated systems.

The foregoing illustrates limitations known to exist in present fluid pressure regulator valves. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a valve seat assembly for a fluid pressure regulator comprising a valve seat housing with first and second ends and a central axial bore, a rigid one piece valve seat with a central axial bore, and a mechanism for positioning the valve seat in a floating relationship, coaxial with, and adjacent to the second end of the housing.

The foregoing and other aspects will become apparent from the following detailed description of the invention when considered in conjunction with the accompanying drawing figures.

DETAILED DESCRIPTION

Figure 1:
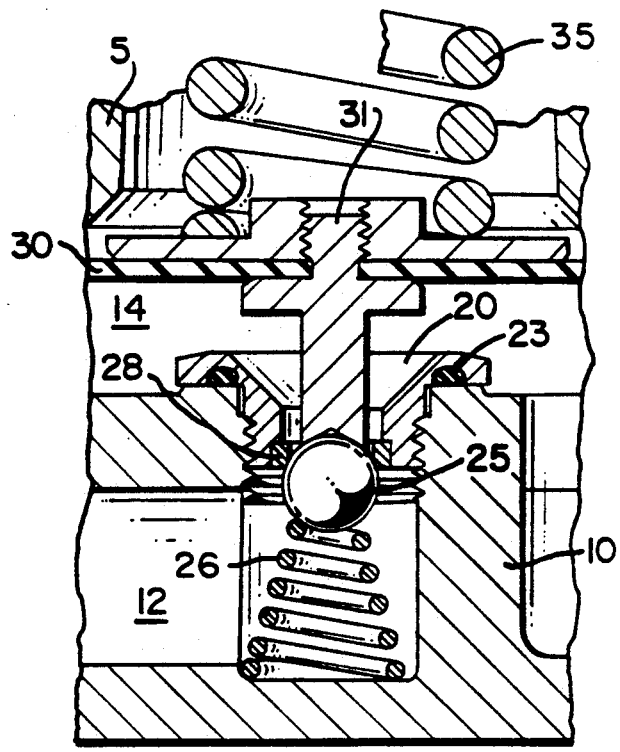
FIG. 1 is a fragmentary cross-sectional schematic view of a standard single-stage fluid pressure regulator of the prior art.

FIG. 1 shows a typical single-stage fluid pressure regulator sectioned to reveal details of its construction. The shell of the regulator is made up of the regulator body 10, which houses the valve assembly and the fluid flow passages, and the bonnet 5, which houses the screw adjustable diaphragm spring 35 and the diaphragm 30.

The high pressure supply fluid is introduced to inlet chamber 12 through the fluid supply connection, and it exits to the service line, from diaphragm chamber 14, through the service outlet fitting. Between inlet chamber 12 and diaphragm chamber 14 is valve housing 20, which contains valve seat 28. Closure element 25, which is held against valve seat 28 by biasing spring 26, controls the orifice in the valve seat. Valve stem 31 is attached to diaphragm 30 and protrudes through a bore in the center of valve housing 20 and valve seat 28 to contact closure element 25. Thus, movement of diaphragm 30 is transmitted to closure element 25 through valve stem 31. Valve housing 20 is typically threaded into the regulator body 10. A flexible seal 23 is clamped between the flange of housing 20 and regulator body 10.

Figure 2:
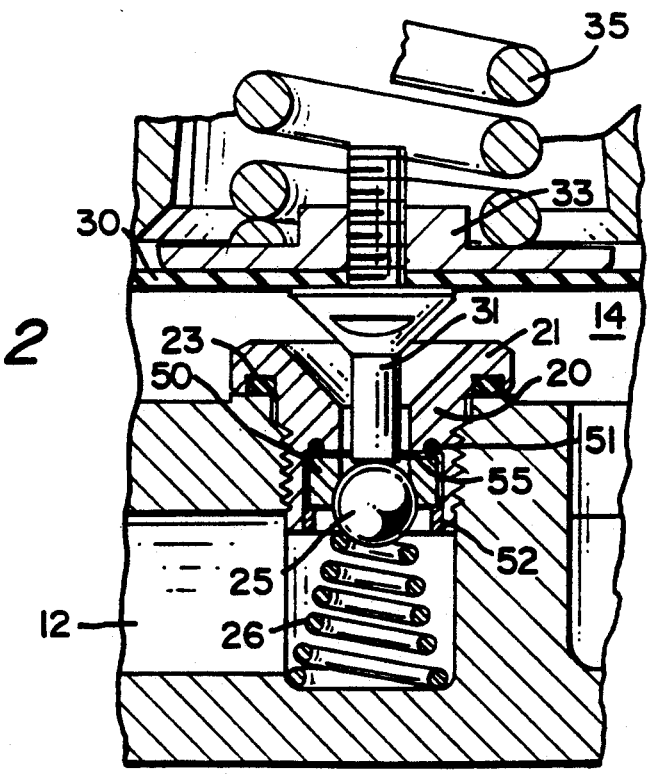
FIG. 2 is a fragmentary schematic cross-sectional view of a fluid pressure regulator incorporating the preferred embodiment of the present invention.

The valve arrangement of the present invention is shown in FIG. 2. In all other respects, the regulators of FIGS. 1 and 2 are identical.

The valve seat housing 20 of the present invention is functionally similar to that of FIG. 1. In this case, valve seat housing 20 is, however, larger and of generally heavier construction, as illustrated.

Here also valve seat 50 is considerably larger than valve seat 28 in FIG. 1. This imparts increased stiffness to the valve seat and makes it less susceptible to distortion during assembly in the regulator. In addition, valve seat 50 is held in valve seat housing 20 by retainer sleeve 52 which is press fit into the bore of valve seat housing 20. Valve seat 28 in FIG. 1 is brazed or press fit into the bore of valve housing 20. By employing retainer sleeve 52 in FIG. 2, valve seat 50 can be made with a minute clearance between its outside surface and the inner surface of housing bore 61. A flexible seal 51, which may be made of rubber, plastic, or some other resilient material, provides the seal necessitated by the clearance between valve seat 50 and housing bore 61. Thus the combination of the retainer sleeve 52, the minute clearance between valve seat 50 and housing bore 61, and the flexible seal 51, results in a floating valve seat 50 which is mechanically isolated from valve seat housing 20 and which, therefore, is not subject to distortions or stresses which might otherwise be transferred to valve seat 50 from housing 20 during assembly.

The valve arrangement shown in FIG. 1 has a valve seat 28 which is not as strong as that of the present invention. In addition, it is usually brazed into the bore of valve housing 20. Other methods of attaching valve seat 28 to housing 20 may be used, but whatever the method used, the fit must be fluid tight and consequently rigid. As a result of this rigidity, any distortion or stress introduced to the valve housing 20 during assembly into the regulator will be transmitted directly to valve seat 28. This may produce minute distortions in valve seat 28 which can result in pressure creep of the regulator under static conditions.

Figure 3:
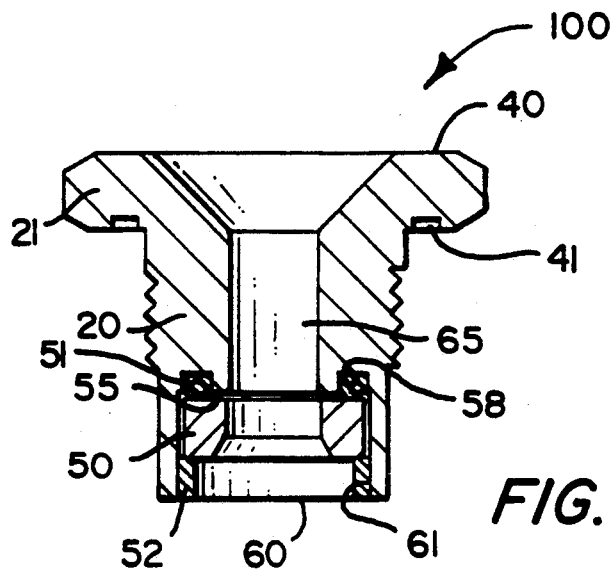
FIG. 3 is an enlarged cross-sectional view of the valve seat assembly of the present invention.

FIG. 3 is an enlarged view of valve seat assembly 100 which includes valve seat housing 20 having first housing end 40, second housing end 60, flange 21, O-ring groove 41, housing bore 61, and central axial bore 65. Valve seat 50, which has a slip fit in housing bore 61, is retained within the bore by retainer sleeve 52 which is pressed into housing bore 61. Flexible seal 51 is positioned in seal groove 58 and is interposed between valve seat 50 and housing 20 at the internal annular ledge 55 produced in the housing by the differing diameters of housing bore 61 and central axial bore 65.

Having been designed with heavier walls and a heavier flange, housing 20 of the present invention can tolerate higher stresses with less distortion than can the housing illustrated in FIG. 1. Thus the present invention provides a stronger housing in addition to providing a mechanically decoupled valve seat 50 floating against seal 51. As a result, housing stresses and distortions, introduced by assembly into the regulator, are not transmitted to the valve seat. Thus the most common cause of pressure regulator creep under static conditions has been eliminated.

Figure 4:
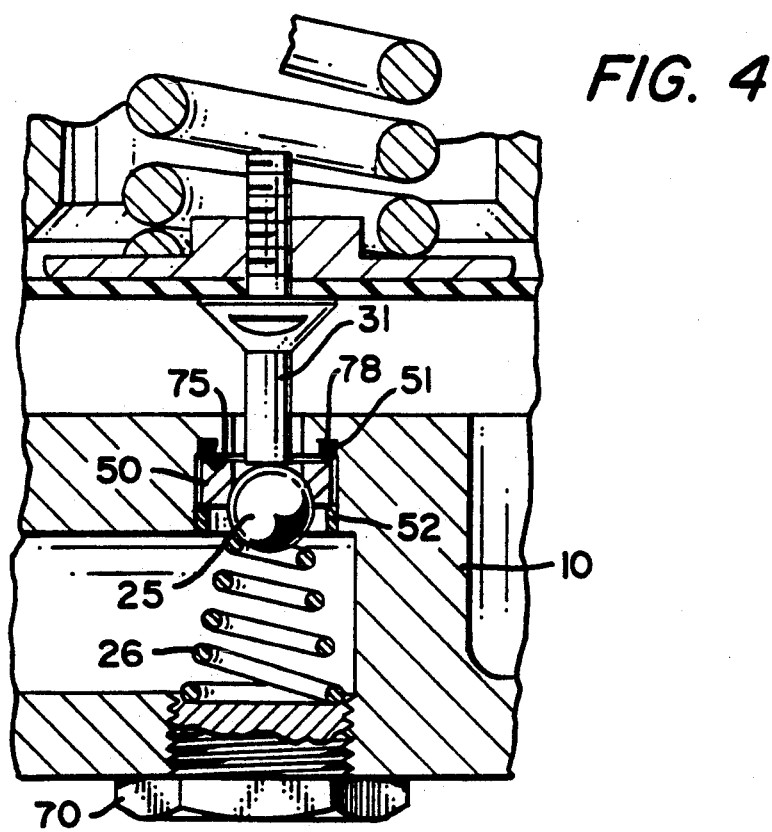
FIG. 4 is a fragmentary schematic cross-sectional view of a fluid pressure regulator incorporating an alternative embodiment of the present invention.

FIG. 4 shows an alternative embodiment of the invention in which the floating valve seat 50 is directly placed with a slip fit in the fluid flow passage of the regulator body 10 and held by press fitted retainer ring 52. In this case, annular ledge 75 is formed by the juncture of a bore coaxial with the fluid flow passage and larger than that passage. Annular groove 78 is formed in annular ledge 75 to accommodate flexible seal 51. A threaded plug 70 is also provided in this embodiment. This is required in order to permit installation of seal 51, valve seat 50, retainer 52, closure element 25, and biasing spring 26. All other features are functionally similar to those of the preferred embodiment.

Figure 5:
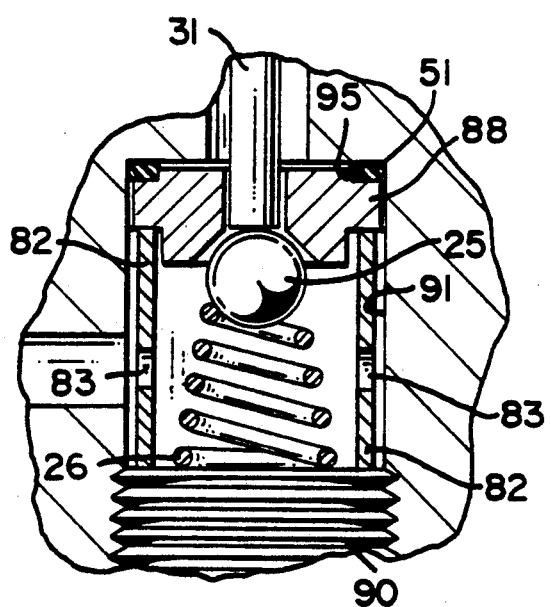
FIG. 5 is an illustration of another alternative embodiment of the present invention.

Another embodiment is illustrated in FIG. 5. Here floating valve seat 88 is placed in a bore 91 of the regulator body 10 and is held in place by spacer tube 82 which has a cross hole 83 to admit fluid. Spacer tube 82 is held in place by access plug 90 which also supports spring 26 and closure element 25. Seal 51 is placed on shoulder 95 of valve seat 88 which is clamped in a floating relationship between spacer tube 82 and seal 51. In all other respects, the regulator is similar to standard regulators.

The invention has been described in terms of a preferred embodiment which makes it possible to incorporate this invention in existing regulators by retrofit. Alternative embodiments have also been described wherein the floating seat is incorporated directly in a regulator body 10 with the same slip fit, flexible seal, and retainer sleeve provisions as were applied with the valve housing of the preferred embodiment. A slip fit, spacer tube, and flexible seal is also shown. Other variations may be practiced within the scope of the claims.

What is claimed is:

1. A valve seat assembly for a fluid pressure regulator comprising:
    a valve seat housing having first and second ends and a central axial bore, said bore having two portions with different diameters and an annular sealing ledge therebetween;
    a rigid one-piece valve seat having a central axial bore;
    a resilient sealing ring positioned against said annular sealing ledge; and
    means for positioning said valve seat, in a sealing relationship with said resilient sealing ring and in a floating relationship, coaxial with and adjacent to said annular sealing ledge in said second end of said valve seat housing in a fluid flow passage of said fluid pressure regulator.

2. The valve seat assembly of claim 1, further comprising:
    threads on the exterior of said valve seat housing and on the interior of said fluid flow passage which engage to fix the position of the valve seat housing within the fluid flow passage.

3. A valve assembly for a fluid pressure regulator having a body with a fluid flow passage therethrough, comprising:
    a valve seat housing having first and second ends and a central axial bore, said bore having two portions with different diameters and an annular sealing ledge therebetween;
    a rigid one-piece valve seat having a central axial bore;
    a resilient sealing ring positioned against said annular sealing ledge;
    means for positioning said valve seat, in a sealing relationship with said resilient sealing ring and in a floating relationship, coaxial with and adjacent to said annular sealing ledge in said second end of said valve seat housing within said fluid flow passage;
    a spherical valve closure element positioned adjacent to one side of said floating valve seat and biased against said valve seat by a spring; and means, unattached to said valve closure element and responsive to fluid pressure changes in a service outlet, for pushing said valve closure element counter to said bias to vary a pressure drop through said valve assembly in response to said fluid pressure changes.

4. The valve assembly of claim 3, wherein the means unattached to said valve closure element and responsive to fluid pressure changes in a service outlet comprises a flexible diaphragm coupled to a valve stem which protrudes through the central axial bore of the valve seat housing and the axial bore of the valve seat to contact and control said valve closure element by exerting a variable force counter to the constant bias of said closure element.

5. A valve assembly for a fluid pressure regulator comprising:
   a regulator body;
   a rigid one-piece valve seat having a central axial bore;
   means for positioning said valve seat in a mechanically decoupled floating sealing relationship with and coaxial with an annular sealing ledge in a fluid flow passage of said regulator body;
   a spherical valve closure element positioned adjacent to one side of said floating valve seat and biased against said valve seat by a spring; and
   means unattached to said valve closure element for pushing said valve closure element counter to said biasing means to adjust its axial location relative to said valve seat so as to vary a pressure drop through said valve assembly in response to fluid pressure changes.

6. The valve assembly of claim 5, wherein the means unattached to said valve closure element and responsive to fluid pressure changes in a service outlet comprises a flexible diaphragm having a valve stem which protrudes through the central axial bore of said valve seat housing and the axial bore of the valve seat to contact and control said valve closure element by exerting a variable force counter to the constant bias of said closure element.

7. A valve seat for use in a fluid passage of a fluid pressure regulator having an annular radial ledge, with one or more flat annular surfaces thereon, defined by a juncture of large diameter and small diameter portions of said fluid passage, comprising:
   a rigid one-piece valve seat, having one or more flat annular surfaces on axial faces thereof, placed in said fluid passage and having an outside diameter smaller than the large diameter portion of said fluid passage so as to provide a mechanical clearance therebetween;
   an annular resilient seal ring interposed between flat annular surfaces of said valve seat and said annular radial ledge; and
   means for forcing said valve seat against said resilient seal ring so as to float in a mechanically decoupled sealed relationship with said radial ledge.

8. In a fluid passage regulator of the type having a body with a fluid passage therethrough connecting a fluid inlet and a fluid outlet, a valve seat housing in said fluid passage formed by a ledge at a juncture of a large diameter portion of said fluid passage proximal to said fluid inlet and a small diameter portion of said fluid passage proximal to said fluid outlet, said ledge having one or more flat annular surfaces, an adjustably biased diaphragm forming one wall of an outlet chamber downstream from said valve seat housing, an elongate valve stem fixed to said diaphragm and projecting through said valve seat and said valve seat housing so as to move axially in response to corresponding movements of said diaphragm, a valve closure element upstream of said valve seat and aligned with said valve stem so as to follow movements of said valve stem caused by corresponding movements of said diaphragm in response to pressure changes in said outlet chamber, the improvement, in combination with said regulator, comprising:
   a non-deformable one-piece seat having a central axial fluid passage and one or more flat annular surfaces on its axial faces, said valve seat being interposed between said valve stem and said valve closure element and having an outside diameter which provides a loose fit in said large diameter portion of said fluid passage in said valve seat housing;
   a resilient seal ring interposed between at least one of said flat annular surfaces on the axial faces of said one-piece valve seat and at least one of said flat annular surfaces of said ledge of said valve seat housing; and
   means for securing said one-piece valve seat against said resilient seal ring so as to provide a fluid seal while maintaining freedom to float both axially and radially and to thereby be mechanically decoupled from said valve seat housing.

* * * * *